Patented Feb. 24, 1948

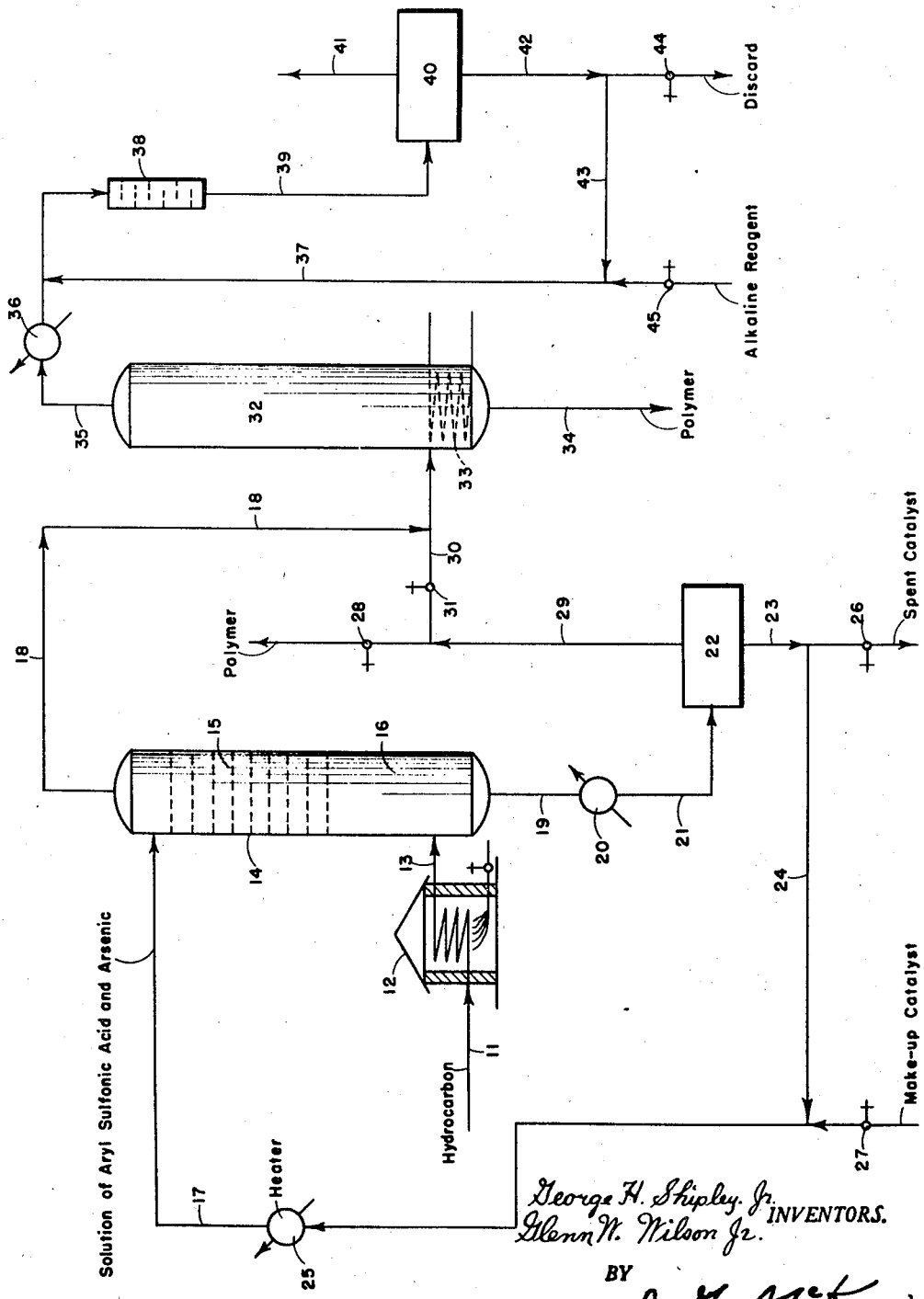

2,436,494

UNITED STATES PATENT OFFICE 2,436,494

METHOD FOR TREATING A HYDROCARBON FEED STOCK WITH A SOLUTION OF TOLUENE SULPHONIC ACID AND SODIUM META ARSENITE

George H. Shipley, Jr., Baytown, and Glenn W. Wilson, Jr., Goose Creek, Tex., assignors, by mesne assignments, to Standard Oil Development Company, Elizabeth, N. J., a corporation of Delaware Original application May 12, 1945, Serial No. 593,456. Divided and this application March 7, 1947, Serial No. 733,236

5 Claims. (Cl. 260—674)

The present invention is concerned with a process for treating hydrocarbons in which the hydrocarbons are contacted with an anhydrous aryl sulfonic acid. More particularly, the invention relates to the catalytic treatment of hydrocarbons in which a catalyst comprising an aryl sulfonic acid and arsenic is employed.

This application is a division of U. S. Serial No. 593,456, filed May 12, 1945, now Patent No. 2,428,686.

It is known to treat hydrocarbons with aryl sulfonic acids to remove sulfur, to improve the color, or to enhance the octane number of the hydrocarbons. It is known to treat hydrocarbons in the vapor phase with a solution of aryl sulfonic acid in an organic solvent; it is also old to treat hydrocarbons with aqueous solutions of sulfonic acids. In the particular instance when aqueous solutions are employed, the aryl sulfonic acids do not exert a catalytic effect, but are consumed in the operation and are rejected from the process as a sludge formed with the reaction products.

Employment of the aryl sulfonic acids in an organic solution is disadvantageous by virtue of the fact that the solution is highly corrosive to ordinary steels and requires special alloys of steel or copper-bearing metals for safe handling. It is disadvantageous to use the aqueous solution of the sulfonic acids since this results in consumption of the treating reagent as well as consumption of the hydrocarbon undergoing treatment.

We have now found that the disadvantages of the prior art may be overcome by employing the aryl sulfonic acids as solutions of the anhydrous acid in an organic solvent provided arsenic or a compound of arsenic is present during the reaction. In accordance with the present invention, we realize this beneficial effect by adding a small quantity of arsenic to the aryl sulfonic acids and then employ the mixture in services in which the aryl sulfonic acids have been found beneficial. We may add arsenic as the element or as a compound and when the compound is used, we may use sodium meta arsenite, arsenic trioxide, arsenic acid, arsenic pentoxide or any other arsenic compound which will dissolve readily in the catalyst solution.

It will be found desirable to maintain the arsenic in the catalyst within the range of 0.013 to 0.0013 gram moles of arsenic per 100 grams of catalyst solution, that is to say, the arsenic in the catalyst will ordinarily be less than 1 percent by weight of the total mixture and usually less than .5 percent by weight will be required. In some instances, as little as 0.1 percent by weight of arsenic is effective in reducing the corrosivity of the aryl sulfonic acid in organic solutions to the extent that ordinary steel equipment may be satisfactorily employed.

The type of reaction in which the present invention finds use is in treating hydrocarbons to remove undesirable constituents, for example, removing olefinic materials from toluene, condensation and polymerization reactions, desulfurization of hydrocarbons and in many other catalytic reactions. The invention is especially useful in preparing nitration grade toluene in which small amounts of olefins cannot be tolerated.

The sulfonic acid may be selected from the sulfonic acids including benzene sulfonic acid, toluene sulfonic acid, naphthalene sulfonic acid and any other of the aryl sulfonic acids which may be available.

The solvent employed is preferably an aromatic hydrocarbon. Benzene, toluene and the homologues of this series of compounds are especially useful in this respect. It will be desirable to employ from about 5% to 60% by volume of the aryl sulfonic acid in the solvent. Usually a 30% to 50% solution will form an effective catalyst.

The reactions may be carried out in the vapor or liquid phase. Ordinarily when operating in the liquid phase, pressures will be employed to provide liquid phase conditions for the hydrocarbon. The temperatures at which the present invention is conducted may vary from about 100° to 400° F. depending on the type of hydrocarbon being reacted. When treating toluene for removal of olefins with the toluene in the vapor phase, it will be desirable to employ a temperature of about 240° to 250° F. These conditions are particularly suitable when a solution of toluene sulfonic acid dissolved in toluene containing arsenic or its compounds is the treating medium.

The present invention will be further illustrated by reference to the drawing in which the single figure represents one embodiment. It will be understood that the following description given in conjunction with the drawing of the treatment of toluene for removal of olefins is for purposes of illustration only and is not to be considered as limiting our invention to the specific embodiment.

Referring now to the drawing numeral 11 designates a charge line through which toluene is introduced into the system. The toluene is heated and vaporized in heater 12 and is brought to a temperature of about 250° F. The heated and vaporized toluene discharges from heater 12 by way of line 13 into contact zone 14 which, in this particular instance, is shown as a tower, Contact zone 14 includes a packed section 15 and an accumulating section 16.

The catalyst, in this particular instance toluene sulfonic acid plus arsenic pentoxide dissolved in toluene, is introduced thereto by way of line 17 at a temperature of about 240° to 250° F. The catalyst passes downwardly through the packed section 15 of contact zone 14 and meets the ascending toluene vapors flowing upwardly therethrough. Treated hydrocarbons emerge from zone 14 by way of line 18 while the catalyst accumulating in zone 16 is withdrawn by line 19, cooled in cooler 20, and discharged by line 21 into settling zone 22. In settling zone 22, the catalyst is separated from any polymers which may have been formed in contact zone 14 and the separated catalyst is withdrawn from zone 22 by line 23 for recycling by lines 24 and 17 back into contact zone 14. Line 17 is provided with heater 25 for adjustment and maintenance of the proper temperature of the catalyst. A drawoff is provided by valve 26 in line 23 for discard of used catalyst, and valve 27 in line 17 is provided for introduction of make-up catalyst containing arsenic pentoxide.

Any polymers which accumulate in the catalyst separate therefrom in zone 22 and may be withdrawn by opening valve 28 in line 29, or preferably may be retained in the system by routing them to line 30 controlled by valve 31 along with the treated material in line 18 to fractionation zone 32.

Fractionation zone 32 is provided with a heating means 33 for adjustment of temperatures and pressures, line 34 for withdrawal of polymers and other heavy material, and line 35 for withdrawal of the product.

The product, issuing as vapors through line 35, is condensed and cooled in condenser 36 and has introduced thereinto, by way of line 37, an alkaline reagent. The mixture of alkaline reagent and treated hydrocarbon passes through an incorporator device 38 wherein it is intimately contacted before flowing through line 39 into settling zone 40. Settling zone 40 is of sufficient capacity to provide residence time for separation by gravity of the alkaline reagent and the treated hydrocarbon. The treated hydrocarbon is withdrawn from zone 40 by line 41. The alkaline reagent is discharged by line 42 and is recycled by branch line 43 into line 37. Line 42 contains a valve 44 for discard of used alkaline reagent and line 37 contains a valve 45 for introduction of fresh alkaline reagent.

Prior to the present invention, the ferrous metal equipment making up contact zone 14, settling zone 22, and connecting lines became rapidly corroded by the action of the toluene sulfonic acid. The corrosion rate was so severe that under some conditions as much as 2.5 inches of the metal per year was penetrated. Under similar conditions when arsenic pentoxide is used in the amount of 0.2% by weight, the corrosion rate is reduced to 0.001 inch per year penetration of the metal. Similar results are obtained with sodium meta arsenite and other arsenic-containing materials.

In order to illustrate the invention further, a steel strip was immersed in a boiling toluene solution containing 50 weight per cent anhydrous toluene sulfonic acid. After 27 hours exposure in the boiling solution, it was observed that the corrosion of the steel strip as reflected by the penetration rate in inches per year was 2.52. Similar steel strips were immersed in boiling toluene solutions containing 50 weight percent toluene sulfonic acid containing, in one instance, 0.2 weight percent arsenic pentoxide and in another instance 0.2 weight percent sodium meta arsenite. The steel strips were allowed to remain in the boiling solutions for 72½ hours, after which they were removed, washed, dried and weighed. In the first instance where the boiling solution was inhibited with arsenic pentoxide, the corrosion rate was found to be 0.001 inch penetration per year, while in the second instance when sodium meta arsenite was present, the corrosion rate as evidenced by penetration of the metal was 0.003 inch per year.

It will thus be seen that by the practice of the present invention, it is possible to employ ordinary steels in treating hydrocarbons with organic solutions of the aryl sulfonic acids which results in a considerable savings in capital expenditure.

The nature and objects of the present invention having been fully described and illustrated, what we wish to claim as new and useful and to secure by Letters Patent is:

1. A process for treating a hydrocarbon feed stock which comprises contacting the feed stock with a solution comprising a major portion of aryl sulfonic acid and a minor portion of sodium meta arsenite dissolved in an organic solvent at a temperature within the range from 100° to 400° F.

2. A process for treating a hydrocarbon feed stock which comprises contacting the feed stock with a solution comprising aryl sulfonic acid within the range of 30 to 50 volume per cent and sodium meta arsenite within the range of 0.0013 to 0.013 gram moles per 100 grams of solution dissolved in an organic solvent at a temperature within the range of 100° to 400° F.

3. A process for treating a hydrocarbon feed stock which comprises contacting the feed stock with a solution of toluene sulfonic acid and sodium meta arsenite dissolved in an aromatic solvent at a temperature in the range of 100° to 400° F., said solution comprising toluene sulfonic acid within the range of 30–50 volume per cent and sodium meta arsenite within the range of 0.0013 to 0.013 gram moles per 100 grams of solution.

4. A method for removing olefins from toluene which comprises contacting superheated toluene vapors in a solution at a temperature no less than atmospheric and comprising toluene sulfonic acid and a minor portion of sodium meta arsenite dissolved in an aromatic solvent.

5. A method in accordance with claim 4 in which said solution comprises toluene sulfonic acid within the range of 30 to 50 volume per cent and sodium meta arsenite within the range of 0.0013 to 0.013 gram moles per 100 grams of solution.

GEORGE H. SHIPLEY, Jr.
GLENN W. WILSON, Jr.

REFERENCES CITED

The following references are of record in the file of this patent:

UNITED STATES PATENTS

| Number | Name | Date |
|---|---|---|
| 2,055,416 | Moser | Sept. 22, 1936 |

FOREIGN PATENTS

| Number | Country | Date |
|---|---|---|
| 388,547 | Germany | Jan. 15, 1924 |
| 437,864 | Great Britain | Nov. 6, 1935 |